US005754264A

United States Patent [19]

Bryan-Brown et al.

[11] Patent Number: 5,754,264

[45] Date of Patent: May 19, 1998

[54] FERROELECTRIC LIQUID CRYSTAL DEVICE ALIGNMENT

[75] Inventors: Guy Peter Bryan-Brown; Damien Gerard McDonnell; Michael John Towler; John Clifford Jones, all of Malvern, Great Britain

[73] Assignee: The Secretary of State for Defence in Her Britannic Majesty's Government of the United Kingdom of Great Britain and Northern Ireland, Hants, United Kingdom

[21] Appl. No.: 687,495

[22] PCT Filed: Jan. 30, 1995

[86] PCT No.: PCT/GB95/00178

§ 371 Date: Aug. 6, 1996

§ 102(e) Date: Aug. 6, 1996

[87] PCT Pub. No.: WO95/22076

PCT Pub. Date: Aug. 17, 1995

[30] Foreign Application Priority Data

Feb. 9, 1994 [GB] United Kingdom .................. 9402517

[51] Int. Cl.[6] ........................ G02F 1/1337; G02F 1/141; G02F 1/13

[52] U.S. Cl. ........................ 349/123; 349/172; 349/201; 349/133

[58] Field of Search .............................. 349/123, 201, 349/172, 133

[56] References Cited

U.S. PATENT DOCUMENTS

| | | | |
|---|---|---|---|
| 3,787,110 | 1/1974 | Berreman et al. | 349/123 |
| 4,521,080 | 6/1985 | Funada et al. | 349/123 |
| 5,299,289 | 3/1994 | Omae et al. | 349/201 |
| 5,371,618 | 12/1994 | Tai et al. | 349/172 |
| 5,373,380 | 12/1994 | Harada et al. | 349/172 |
| 5,473,448 | 12/1995 | Yoshinaga et al. | 349/201 |
| 5,566,217 | 10/1996 | Kaneko et al. | 349/122 |

OTHER PUBLICATIONS

Lee et al., "Control of the LC Alignment Using a Stamped Morphology Method and its Application to LCDs", SID 93 Digest, pp. 957–960.

Nakamura et al., "Alignment of Nematic Liquid Crystals on Ruled Grating Surfaces", Journal of Applied Physics, vol. 52, No. 1, Jan., 1981, pp. 210–218.

Molecular Crystals and Liquid Crystals, vol. 23, No. e/4, 1973, GB pp. 215–231, Berreman D W 'Alignment of liquid crystals by grooved surfaces'.

*Primary Examiner*—William L. Sikes
*Assistant Examiner*—Toan Ton
*Attorney, Agent, or Firm*—Nixon & Vanderhye P.C.

[57] ABSTRACT

A ferroelectric liquid crystal device comprises a layer of a ferroelectric liquid crystal material contained between two cell walls carrying electrode structures and a surface alignment treatment. The surface alignment is provided by a profiled surface, e.g., a grating, on at least one cell wall. The grating may be a monograting or a bigrating, with a symmetric or asymmetric profile. Such a profiling enables surface tilt and alignment anchoring energy to be independently arranged to suit liquid crystal material and device type to give a required molecular arrangement and low device defect. The grating may be provided by interferography, photolithography, embossing, ruling, or carrier layer transfer. Alignment directions on the cell walls may be parallel or non-parallel. The surface tilt on both cell walls may be the same or different values. The cell walls may be relatively rigid, e.g., glass slides, or flexible, e.g., thin plastic which may have its inner face embossed to provide one or both a grating and a set of spacer pillars.

18 Claims, 4 Drawing Sheets

20
22
23
24
Ar Ion
LASER
21
25
27
20a
26
31
20b
30
29
28

41
39
38
40
37
36
35

FERROELECTRIC LIQUID CRYSTAL DEVICE ALIGNMENT

BACKGROUND OF THE INVENTION

1. Field of the Invention

This invention relates to ferroelectric liquid crystal device alignment.

2. Discussion of Prior Art

Liquid crystal display devices are well known. They typically comprise a liquid crystal cell formed by a thin layer of a liquid crystal material held between two glass walls. These walls carry transparent electrodes which apply an electric field across the liquid crystal layer to cause a reorientation of the molecules of liquid crystal material. The liquid crystal molecules in many displays adopt one of two states of molecular arrangement. Information is displayed by areas of liquid crystal material in one state contrasting with areas in the other state. One known display is formed as a matrix of pixels or display elements produced at the intersections between column electrodes on one wall and row electrodes on the other wall. The display is often addressed in a multiplex manner by applying voltages to successive row and column electrodes.

Liquid crystal materials are of three basic types, nematic, cholesteric, and smectic each having a distinctive molecular arrangement.

The present invention concerns chiral smectic liquid crystal materials particularly ferroelectric smectic liquid crystal materials. Devices using this material include the surface stabilised ferroelectric liquid crystal (SSFLC) device. These devices can show bistability, ie the liquid crystal molecules, more correctly the molecular director, adopt one of two alignment states on switching by positive and negative voltage pulses and remain in the switched state after removal of the voltage. This behaviour depends, in part, upon the surface alignment properties. The switched states may be stabilised by the presence of an ac bias which may be provided by the data (column) voltages in a multiplexed addressed device. Another type of ferroelectric liquid crystal device (FELCD) is the electro-clinic device. SSFLC are described for example in N. A. Clark & S. T. Lagerwall, App Phys Letters 36(11) 1980 pp 899–901, and U.S. Pat. No. 4,367,924. Yet another type is an antiferroelectric device (Ref: A. Fukuda et al. J later. Chem. (1994) 4, 7, 997–1016).

Alignment of ferroelectric liquid crystals is often carried out using rubbed polymer alignments, however this method has several limitations. These include dirt, electrical damage due to discharge between in-plane electrodes and uniformity of pretilt and anchoring. Another known alignment is that of oblique evaporation of eg SiO. This is difficult to employ for large area displays.

It can be shown that if the alignment used introduces a splay in a higher temperature cholesteric phase, then a predominantly (zig-zag) defect free alignment can be achieved in the ferroelectric phase. This may be due to the balance between surface pretilt and surface (zenithal and azimuthal) anchoring energies being able to bias the presence of either the C1 or C2 chevron at the operating temperature. In order to be able to optimise this balance for a given liquid crystal, ideally it is necessary to be able to change surface pretilt and anchoring energies controllably and independently. This is difficult with rubbed polymers as all these properties are manifestations of the same physical interaction.

For some liquid crystal materials the alignment may be very sensitive to this balance and so good uniformity of pretilt and anchoring energies is required over the surface, this is not always achievable with rubbed alignment techniques.

Furthermore in some FLC devices it is crucial to align the preferred directions (defined in the cholesteric phase) accurately with respect to each other, be these parallel or offset at some required angle. This is very difficult with conventional alignments since rubbing leaves no easily observable direction on the surface.

SUMMARY OF THE INVENTION

The above problems are solved according to this invention by the use of gratings on the inner surface of liquid crystal cell walls.

According to this invention a liquid crystal device comprises a layer of a ferro electric smectic liquid crystal material having at least a smectic A phase or a cholesteric phase at higher temperature contained between two cell walls each bearing electrode structures on their inner surface and each surface treated to align liquid crystal material at the surface, characterised by a grating surface alignment on at least one cell wall.

Preferably the grating surface alignment gives independent control of alignment anchoring strength and liquid crystal surface tilt angle whereby a required splay of liquid crystal molecular director may be formed across the liquid crystal layer.

Larger azimuthal anchoring energy can be used for C2 ferroelectrics while weaker anchoring can be used for C1 ferroelectrics or antiferroelectrics.

The grating surface may be a monograting or a bigrating, and may be symmetric or asymmetric (blazed) in any combination. The angle of the gratings between two cell walls may be substantially parallel, or non parallel. A bigrating having at least one asymmetric (blazed) grating can result in both surface alignment and a surface pretilt. Two such surfaces may be arranged so that the liquid crystal molecules adopt a splayed configuration in a higher temperature long pitch cholesteric phase.

The liquid crystal material may be a material having a ferroelectric liquid crystal phase at normal device operating temperatures, particularly those which show less ordered phases, eg smectic A and cholesteric phases, at higher temperatures.

In this context a bigrating surface is one that can be described by $$Y(x,y)=Y(x+mk_x,y+nk_y)$$

where Y is a function describing the surface amplitude, m and n are integers and $k_x$, $k_y$ are periodicities. A single grating is invariant in one of the principal directions x or y. A blazed modulation, in say x-direction, is defined as a surface for which there does not exist a value of h such that $$Y(h-x)=Y(h+x)$$

for all values of x, this definition can similarly be applied to the other principal modulation (grating) direction (y)

An example of a non-blazed (symmetric) bigrating surface is the double sinusoidal structure described by $$Y=a_1\sin k_x x+a_2\sin k_y y$$

if either $a_1$ or $a_2$ is set to zero then a single grating is recovered.

For monostable alignment to be achieved on a bigrating surface, in a higher temperature cholesteric (or smectic A)

phase then one grating modulation has to be energetically dominant over the other; ie $a_1^2k_x^3>a_2^2k_y^3$. If a liquid crystal, possessing the phase sequence long pitch cholesteric—(Smectic A)—ferroelectric smectic, is present between two such grating surfaces, which are arranged with their principle directions substantially parallel then heating into the cholesteric phase will give a monostable alignment which when cooled into the ferroelectric smectic phase yields a well aligned liquid crystal.

The bigrating may be a profiled layer of photopolymer formed by an interferographic process; eg M. C. Hutley, Diffraction Gratings (Acedemic Press, London 1982) p95–125; or a photolithographic process eg F Horn, Physics World, 33 (March 1993). Alternatively, the bigrating may be formed by embossing; M. T. Gale, J Kane and K. Knop, J Appl Photo Eng, 4, 2, 41 (1978), or ruling; E. G. Loewen and R. S. Wiley, Proc SPIE, 815, 88 (1987), or by carrier layer transfer.

One or both cell walls may be formed of a relatively thick non flexible material such as a glass, or one or both cells walls may be formed of a flexible material such as a thin layer of glass or a plastic material eg polypropylene. A plastic cell wall may be embossed on its inner surface to provide a grating. Additionally, the embossing may provide small pillars (eg of 1–3 μm height and 5–50 μm or more width) for assisting in correct spacing apart of the cell walls and also for a barrier to liquid crystal material flow when the cell is flexed. Alternatively the pillars may be formed by the material of the alignment layers.

BRIEF DESCRIPTION OF THE DRAWINGS

One form of the invention will now be described, bit way of example only, with reference to the accompanying drawings of which:-

DETAILED DISCUSSION OF PREFERRED EMBODIMENTS

Figure 1:
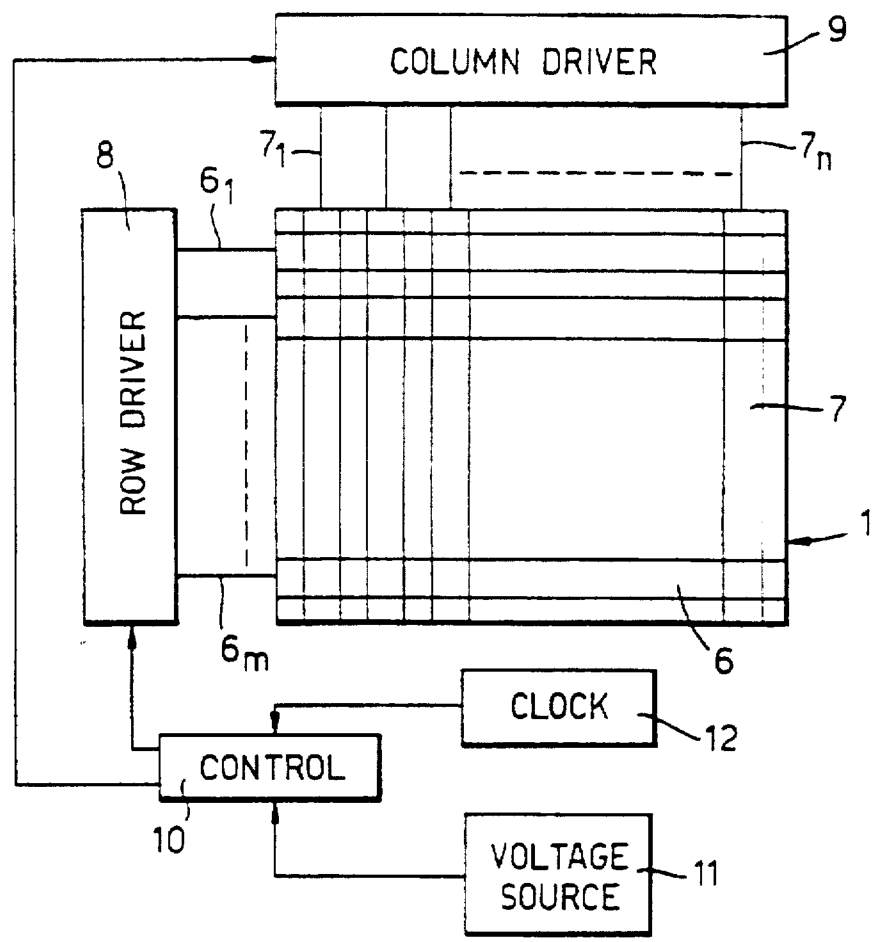
FIG. 1 is a plan view of a matrix multiplex addressed liquid crystal display.
Figure 2:
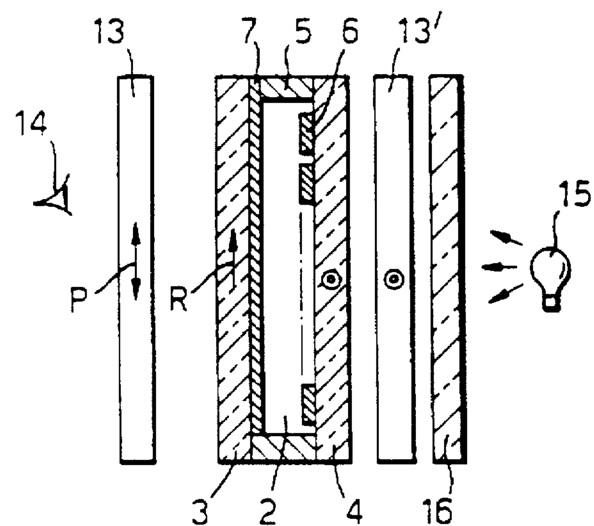
FIG. 2 is a cross section of the display of FIG. 1.

The display of FIGS. 1, 2 comprises a liquid crystal cell 1 formed by a layer 2 of ferroelectric liquid crystal material contained between glass walls 3, 4. The material 2 has a less ordered higher temperature phase, eg smectic C, smectic A, long pitch cholesteric with increasing temperatures. A long pitch cholesteric can be defined as a cholesteric pitch greater than layer thickness. A spacer ring 5 maintains the walls typically 2 μm apart.

Additionally numerous 2 μm diameter beads may be dispersed in the liquid crystal material to maintain an accurate wall spacing. Strip like row electrodes 6 eg of SnO2 or ITO are formed on one wall 4 and similar column electrodes 7 formed on the other wall 3. With m-row and n-column electrodes this forms an m.n matrix of addressable elements or pixels. Each pixel is formed be the intersection of a row and column electrode.

A row driver 8 supplies voltage to each row electrode 6. Similarly a column driver 9 supplies voltages to each column electrode 7. Control of applied voltages is from a control logic 10 which receives power from a voltage source 11 and timing from a clock 12.

Either side of the cell 1 are polarisers 13, 13'. Conventional surface stabilised ferroelectric bistable devices switch between two stable states having alignment either side of a surface alignment direction favoured by the rubbing directions. For devices of the present invention both cell walls 3, 4 have bigrating alignment and switch between two stable states having alignment either side of a principle grating direction. The polarisers 13, 13' are arranged with their polarisation axis crossed with respect to one another with the axis of one polariser parallel to one of the two (switched) stable state alignment directions.

A partly reflecting mirror 16 may be arranged behind the cell 1 together with a light source 15. These allow the display to be seen in reflection and it from behind in dull ambient lighting. For a transmission device, the mirror may be omitted.

Prior to assembly the cell of FIGS. 1, 2 at least one cell wall is surface treated to provide a bigrating; the other wall may have either a bigrating or a monograting or a conventional eg rubbing alignment treatment. Apparatus for producing this bigrating is shown in FIG. 3.

Figure 3:
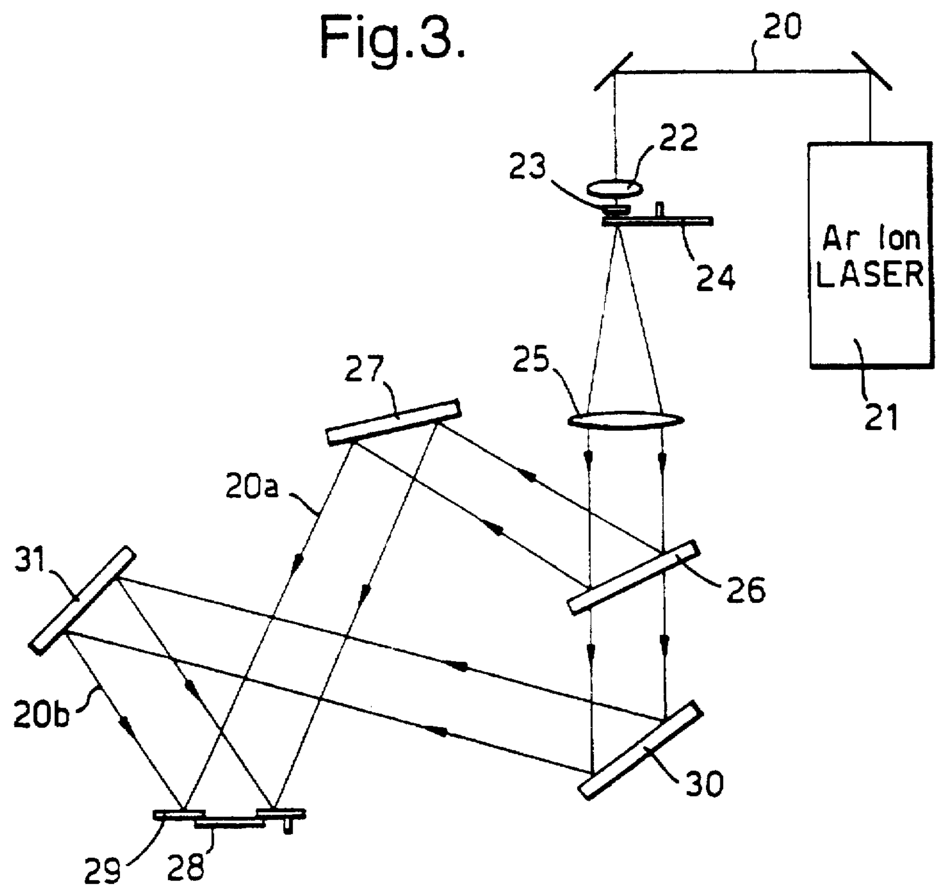
FIG. 3 is a diagrammatic view of apparatus for producing grating surfaces of a cell wall.

As shown in FIG. 3 light 20 from an argon ion laser 21 is focused by a first lens 22 onto a fixed first diffuser 23 and a rotating second 24 diffuser. A second lens 25 recollimates the now expanded laser beam onto a semi aluminised beamsplitter 26. Light is reflected from the beamsplitter 26 onto a first mirror 27 and thence onto a substrate 28 supported in a holder 29. Light transmitted through the beam splitter 26 is reflected off a second mirror 30 and a third mirror 31 onto the substrate. Thus the substrate 28 receives two beams *20a*, *20b* which sets up a stationary fringe pattern. The pitch of the fringe pattern depends upon the angle between the two beams *20a*, *20b* coming from the first and third mirrors 27, 31.

A sinsoidal (symmetric) bigrating may be produced by the apparatus of FIG. 3 as follows:

EXAMPLE 1

A piece of ITO coated glass 28 to form a cell wall was cleaned in acetone and isopropanol and Was then spin coated with a photopolyimide (Nissan RN901) at 4000 rpm for 20 seconds to give a coating thickness of 1.2 μm. Softbaking was then carried out at 80° C. for 30 minutes. The sample 28 was then exposed to an interference pattern of light generated from the argon ion laser 21 (wavelength of 457.9 nm) as shown in FIG. 3.

The sample 28 was given a 90 second exposure at a power density of 1.5 mW/cm$^2$. A second exposure also of 90 seconds duration was then carried out after the sample 28 had been removed from the holder 29, rotated by 90° and replaced. Development was then carried out by a 60 second immersion in microposit MF319 developer followed by a 30 second rinse in deionised water. Finally the photopolyimide was crossed linked by a 60 minute bake at 170° C. followed by a 30 minute bake at 350° C. In this case the resulting sample contained a surface relief bigrating in which the two principle modulations were at 90° to each other. However it may be advantageous for particular applications if the modulations were at less than 90° to each other, eg 45°.

Figure 4:
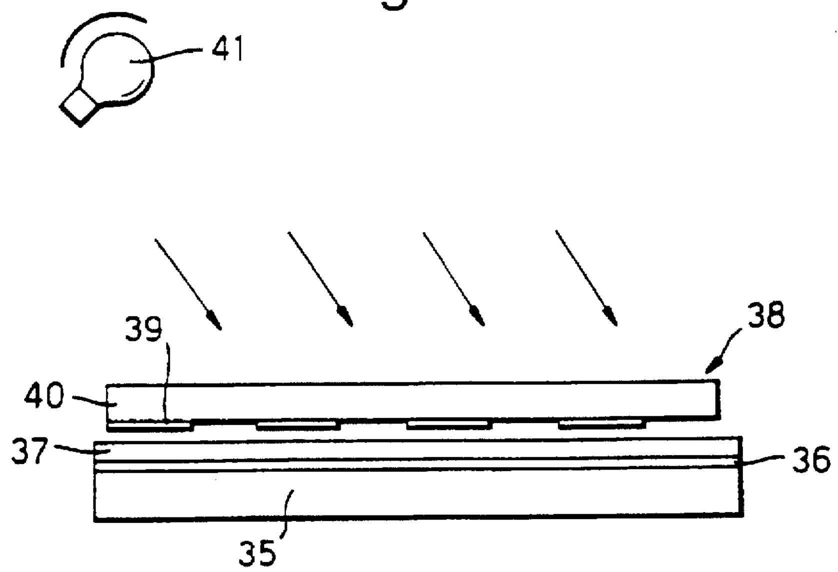
FIG. 4 is a diagrammatic view of alternative apparatus for producing grating aligning surfaces.

The technique above can be used to generate single or double non-blazed gratings. One simple technique for generating a bigrating where one of the principal modulation directions is blazed (nonsymmetric) is shown in FIG. 4.

A substrate 35 carrying a thin indium tin oxide electrode 36 is coated with a photopolymer 37 such as Ciba Geigy 343. Spaced above the polymer 37 is a mask 38 formed be a chrome pattern 39 on a glass slide 40. The chrome pattern is that of a bigrating photolithography mask. A mercury lamp 41 is arranged to illuminate the mask 38 at a non normal angle to the mask surface. The off axis illumination, in a plane defined by the mask normal and one of the mask principal directions, ensures that a blazed profile is obtained (after development in QZ3301 and rinsing in QS3312) in one direction but a non-blazed profile is obtained in the other principal direction. Off-axis illumination that is not in a plane defined by the mask normal and one of the principal directions will give a bigrating that is blazed in both principal directions.

The following FIGS. 5–12 show different arrangements of gratings in a cell.

Figure 5:
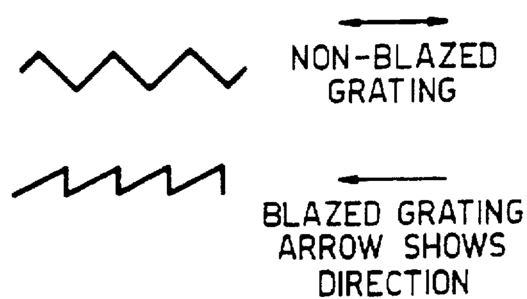
FIG. 5–12 show various configuration of gratings on cell walls.

FIG. 5 shows diagrammatically symmetric (non-blazed) and asymmetric (blazed) profiles together with an indication of double arrows for symmetric and single arrows for blazed direction.

Figure 6:
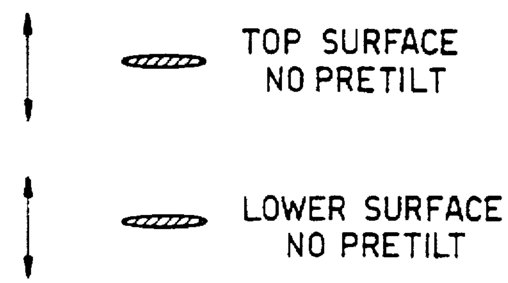

FIG. 6 shows two single grating surfaces aligned substantially parallel (in the same or opposite directions). The shaded ellipses show the LC director alignment obtained in the higher temperature cholesteric phase at each surface. The director alignment is in the same direction with zero surface pretilt in eg a cholesteric phase.

Figure 7:
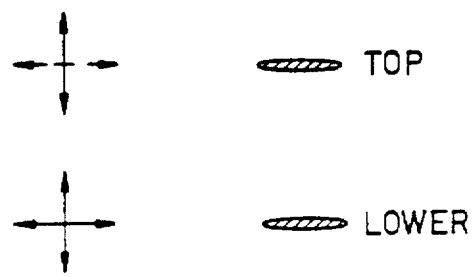

FIG. 7 shows two grating surfaces, the top wall having a non blazed grating (the vertical arrow) and optionally a second non blazed grating (horizontal arrow with broken line) subservient to the other grating. This results in a director alignment shown to be horizontal at the top wall surface and with zero surface tilt. The bigrating on the bottom surface is similar. These two bigratings give substantially non-twisted, monostable alignment in the higher temperature cholesteric phase.

Figure 8:
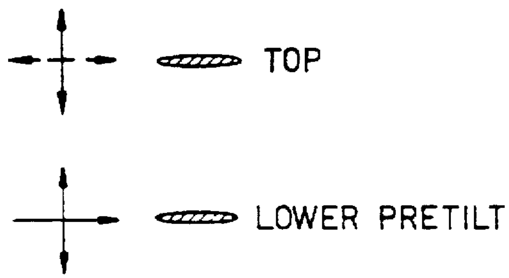

FIG. 8 shows a bigrating at the top surface giving alignment and zero surface tilt. The bottom surface has a symmetric grating and a blazed grating. The symmetric grating is dominant so that the liquid crystal director aligns horizontally, but with a surface tilt provided by the shape of the blazed grating.

Figure 9:
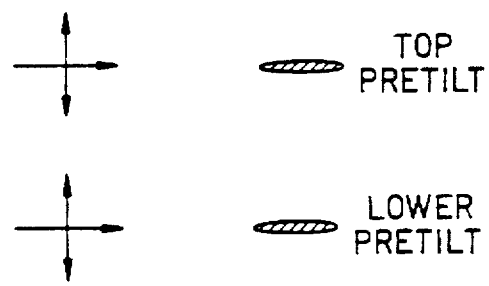

FIG. 9 shows two similar bigratings, a symmetric and an asymmetric grating on both cell walls; the symmetric gratings are dominant. These provide both alignment direction and surface tilt giving a splayed director configuration in a cholesteric phase.

Figure 10:
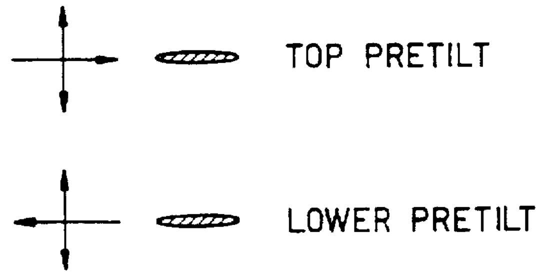

FIG. 10 is similar to FIG. 9 except that the blaze direction on the lower surface is in the opposited direction to that on the top surface. These give a substantially non-twisted, monostable alignment in a higher temperature cholesteric phase.

Figure 11A:
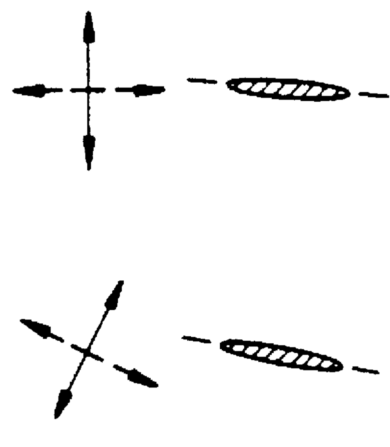

FIG. 11*a* shows two single or bi-grating surfaces azimuthally offset with respect to each other such that the cell would align a cholesteric liquid crystal in a monostable twisted state. The offset angle can be adjusted to stabilise or destabilise half-splayed states in a ferroelectric liquid crystal in a chevron layer geometry.

Figure 11B:
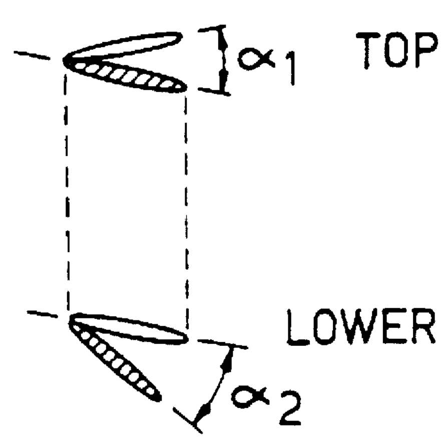

FIG. 11*b* shows two bigrating surfaces each of which have two preferred alignment states for a cholesteric in contact with the surface. Both gratings in each bigrating are of equal anchoring energy which results in the two preferred alignment direction. The bigratings are arranged offset to each other to give a substantially uniform monostable alignment in a cholesteric phase. The angle between the bistable states at each surface can be adjusted to stabilise or destabilise half-splayed states in a ferroelectric liquid crystal in a chevron layer geometry.

Figure 12:
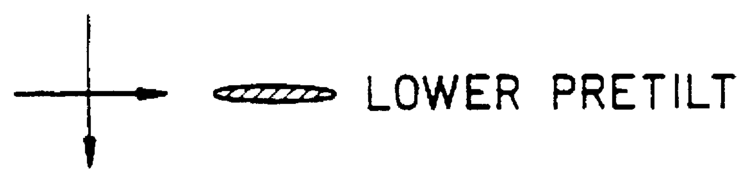

FIG. 12 shows two bigrating surfaces, each with both principal directions blazed to give substantially untwisted alignment in a higher temperature cholesteric phase. Both bigratings provide alignment and surface tilt. The example shown has two of the blaze directions parallel and in the same direction, while the other (dominant) two are parallel and in opposite directions; this allows the adjustment of the stability of the chevron states and also the stability of half-splayed states. An advantage of this arrangement is that the anchoring energy vs alignment direction can be made asymmetric in opposite directions on the two cell walls.

We claim:

1. A liquid crystal device comprising a layer of a ferroelectric smectic liquid crystal material having at least a smectic A phase or a cholesteric phase at higher temperatures contained between two cell walls each bearing electrode structures on their inner surface and at least one cell wall having a surface treatment on said inner surface to align liquid crystal material at the surface, wherein said surface treatment comprises two monogratings, said monogratings on at least one wall where one of said monogratings is energetically dominant over the other.

2. The device of claim 1 wherein the grating surface is a monograting.

3. The device of claim 1 wherein the grating surface is a bigrating.

4. The device of claim 1 wherein at least one grating surface is symmetric.

5. The device of claim 1 wherein at least one grating surface is asymmetric.

6. The device of claim 1 wherein surface alignment directions provided on both cell walls by the gratings are substantially parallel.

7. The device of claim 1 wherein surface alignment directions provided on both cell walls are at a non zero angle to one another.

8. The device of claim 1 wherein the liquid crystal material is a ferroelectric material having the following phases with decreasing temperatures:—isotropic—cholesteric—smectic A—chiral smectic or isotropic—cholesteric—chiral smectic.

9. The device of claim 1 wherein both cell walls have a bigrating surface, and the two gratings are arranged to provide a splayed molecular arrangement throughout the liquid crystal layer in a higher temperature phase.

10. The device of claim 1 wherein both cell walls have a bigrating surface, the bigrating comprising a symmetric grating and an asymmetric grating with the symmetric grating being energetically dominant over the asymmetric grating to give a monostable alignment and a surface molecular pretilt in the smectic A or cholesteric phase of the liquid crystal material, the monostable alignment and pretilt directions being arranged to provide a splayed molecular arrangement throughout the liquid crystal layer in the higher temperature phase.

11. The device of claim 9 wherein the bigrating is a layer formed by interferography, pholtolithography, embossing, ruling, or carrier transfer.

12. The device of claim 1 wherein the cell walls are formed of a glass material.

13. The device of claim 1 wherein the cell walls are formed of a flexible plastic material.

14. The device of claim 1 wherein spacer pillars are formed on one or both cell walls.

15. The device of claim 1 wherein spacer pillars are formed by a material forming the grating on one or both cell walls.

16. The device of claim 1, wherein each of said two monogratings is on a separate inner surface of said two cell walls.

17. The device of claim 1, wherein both of said two monogratings are on a single inner surface of one of said two cell walls.

18. The device of claim 17, wherein said two monogratings on a single cell wall comprise a bigrating.

* * * * *